United States Patent
Cronie et al.

(10) Patent No.: US 11,190,359 B2
(45) Date of Patent: Nov. 30, 2021

(54) DEVICE AND SYSTEM FOR ACCESSING A DISTRIBUTED LEDGER

(71) Applicant: Sony Corporation, Tokyo (JP)

(72) Inventors: Harm Cronie, Echallens (CH); Julian Nolan, Pully (CH)

(73) Assignee: Sony Corporation, Tokyo (JP)

( * ) Notice: Subject to any disclaimer, the term of this patent is extended or adjusted under 35 U.S.C. 154(b) by 151 days.

(21) Appl. No.: 15/819,518

(22) Filed: Nov. 21, 2017

(65) Prior Publication Data
US 2018/0219686 A1    Aug. 2, 2018

(30) Foreign Application Priority Data
Jan. 31, 2017    (EP) .................................... 17154028

(51) Int. Cl.
| | | |
|---|---|---|
| *H04L 9/32* | (2006.01) | |
| *G06F 9/50* | (2006.01) | |
| *G06F 9/455* | (2018.01) | |
| *G06Q 20/06* | (2012.01) | |
| *H04L 29/08* | (2006.01) | |

(52) U.S. Cl.
CPC .......... *H04L 9/3247* (2013.01); *G06F 9/5088* (2013.01); *G06F 2009/4557* (2013.01); *G06Q 20/065* (2013.01); *H04L 67/1097* (2013.01)

(58) Field of Classification Search
CPC . H04L 9/3247; H04L 67/1097; G06F 9/5088; G06F 2009/4557; G06Q 20/065
See application file for complete search history.

(56) References Cited

U.S. PATENT DOCUMENTS

| | | | | |
|---|---|---|---|---|
| 2005/0278438 A1* | 12/2005 | Sandaire | ................ | H04L 67/10 709/223 |
| 2009/0235069 A1* | 9/2009 | Sonnega | ............... | H04L 63/062 713/156 |
| 2013/0282792 A1* | 10/2013 | Graham | .............. | G06F 9/45533 709/203 |
| 2013/0304903 A1 | 11/2013 | Mick et al. | | |
| 2014/0173601 A1* | 6/2014 | Talia | ..................... | G06F 9/5072 718/1 |
| 2015/0100826 A1 | 4/2015 | Vujic et al. | | |
| 2015/0150003 A1* | 5/2015 | Emelyanov | ............. | G06F 9/455 718/1 |
| 2015/0235308 A1 | 8/2015 | Mick et al. | | |
| 2016/0182315 A1* | 6/2016 | Salokanto | ........... | H04L 41/5054 709/226 |
| 2016/0261690 A1* | 9/2016 | Ford | ................... | H04L 67/1044 |
| 2016/0378684 A1* | 12/2016 | Zmudzinski | ........ | G06F 12/1027 711/105 |
| 2018/0020077 A1* | 1/2018 | Folco | ...................... | H04L 47/70 |
| 2018/0027100 A1* | 1/2018 | Jeuk | ........................ | H04L 67/34 370/469 |

(Continued)

OTHER PUBLICATIONS

Extended European Search Report dated May 2, 2017 in connection with European Application No. 17154028.9.

*Primary Examiner* — Henry Tsang
(74) *Attorney, Agent, or Firm* — Wolf, Greenfield & Sacks, P.C.

(57) ABSTRACT

A device for accessing a distributed ledger is provided. The distributed ledger is maintained by a plurality of virtual nodes. The device has a circuitry, which is configured to access the distributed ledger through at least one virtual node of the plurality of virtual nodes.

11 Claims, 2 Drawing Sheets

(56) References Cited

U.S. PATENT DOCUMENTS

2018/0046581 A1\* 2/2018 Banerjee ............. G06F 12/1009
2018/0097638 A1\* 4/2018 Haldenby ................. H04L 9/14
2018/0097783 A1\* 4/2018 Haldenby ............. H04L 9/0861
2018/0137306 A1\* 5/2018 Brady ................... H04L 9/0643

\* cited by examiner

DEVICE AND SYSTEM FOR ACCESSING A DISTRIBUTED LEDGER

CROSS REFERENCE TO RELATED APPLICATIONS

This application claims the benefit of European Priority Patent Application 17154028, filed Jan. 31, 2017, the entire contents of which are incorporated herein by reference.

TECHNICAL FIELD

The present disclosure generally pertains to a device for accessing a distributed ledger and a system for maintaining a distributed ledger.

TECHNICAL BACKGROUND

Generally, it is known to distribute a ledger over multiple entities, e.g. electronic devices, servers or the like, which record digital transactions. Distributed ledgers can be based on the known blockchain technology, on which, for example, the known cryptocurrency bitcoin is based. There is no unified definition about the terms of blockchain and distributed ledger yet. Here, in the broadest definition, the terms are used as a type of database shared digitally recorded data with multiple nodes of a network. It may be comprised of peer to peer network. The digitally recorded data may include a kind of information to prove its consistency from the previously recorded data on the same database. Distributed ledgers can be public and can be accessible by anyone, but, in principle, they can also be non-public and only users having a permission may have access to them. It is also possible to differentiate the access permission to data on a ledger from each layered users.

Distributed ledgers can use mechanisms, which are known, for example, from the blockchain technology as used for bitcoin. Such mechanisms include a discovery method, a consensus mechanism, a mechanism to keep data consistency and so on. The consensus mechanism ensures that all nodes or more than a certain number of nodes, generally electronic devices, having a copy of the distributed ledger reach consensus on the content of the distributed ledger. There are many consensus mechanisms including the so-called proof-of-work mechanism, which is some kind of crypto-puzzle and which ensures that, for example, older blocks of a blockchain cannot be changed (easily). For instance, proof-of-work is used for the mining process of the bitcoin blockchain.

Another example for a distributed ledger which is based on the blockchain technology is the so-called Ethereum project. Ethereum uses accounts and the state of every account is tracked by the Ethereum blockchain. There are two types of accounts, namely externally owned accounts, which are controlled by private keys and contract accounts, which are controlled by their contract code and which can only be activated by an externally owned account. A contract account can include programmable code or smart contracts. Users of Ethereum also have to pay a fee, which is called ether. Ether is rewarded for mining a block.

A further aspect of a distributed ledger is the trust relation established between nodes of the ledger based on the mentioned consensus process. In the bitcoin blockchain proof-of-work is used to add new blocks of transactions to the distributed ledger. Since all the blocks are chained and the proof-of-work function is very complex to compute, it is nearly impossible to change the history of the blockchain.

As an alternative to proof-of-work it is known to use a consensus protocol, such as the known Byzantine fault tolerance algorithm. Typically, by using such algorithms, consensus among nodes can be maintained as long as at least two thirds of the nodes behave correctly. Consensus algorithms may be more relevant for non-public ledgers and situations where proof-of-work is prohibitively complex.

Although there exist techniques for using distributed ledgers, it is desirable to improve the known techniques when the number of nodes is small.

SUMMARY

According to a first aspect, the disclosure provides a device for accessing a distributed ledger, wherein the distributed ledger is maintained by a plurality of virtual nodes, the device comprising circuitry configured to access the distributed ledger through at least one virtual node of the plurality of virtual nodes.

According to a second aspect, the disclosure provides a system for maintaining a distributed ledger, comprising a plurality of virtual nodes for maintaining the distributed ledger; and a plurality of devices for hosting the plurality of nodes.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
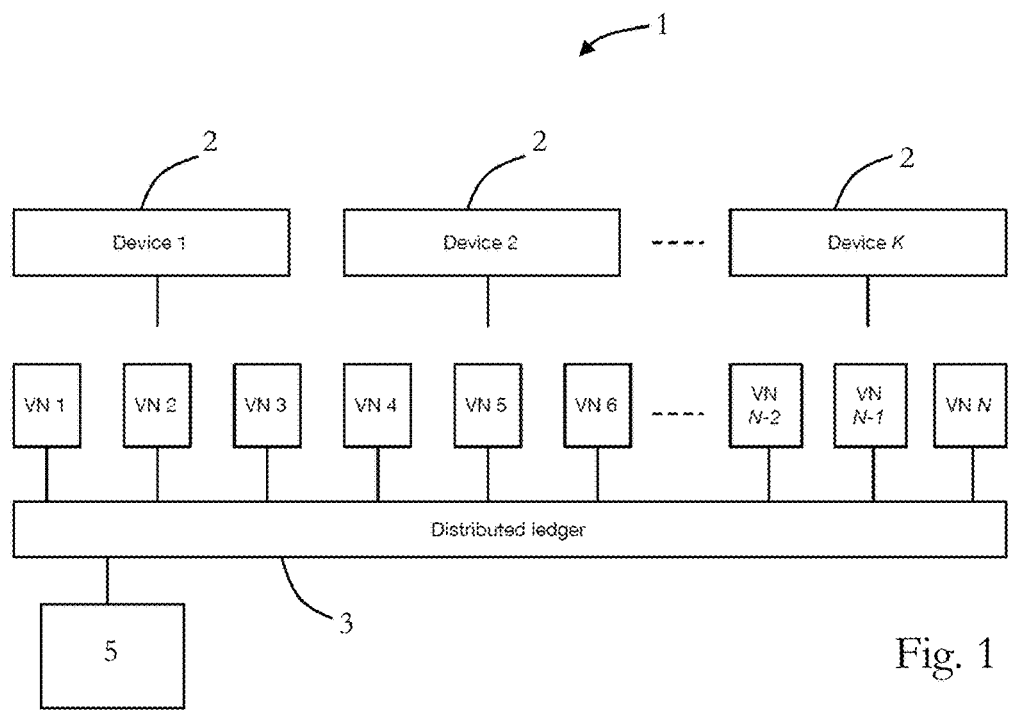
FIG. 1 schematically illustrates a system for maintaining a distributed ledger, wherein the system has multiple devices hosting multiple virtual nodes.

Before describing embodiments under reference of FIG. 1 in detail, general explanations are made. As mentioned in the outset, generally, it is known to distribute a ledger over multiple entities, e.g. electronic devices, servers or the like, which record digital transactions. Distributed ledgers can be based on the known blockchain technology in some embodiments, on which, for example, the known cryptocurrency bitcoin is based. There is no unified definition about the terms of blockchain and distributed ledger yet. Here, in the broadest definition, the terms are used as a type of database shared digitally recorded data with multiple nodes of a network. It may be comprised of peer to peer network. The digitally recorded data may include a kind of information to prove its consistency from the previously recorded data on the same database.

In some embodiments, distributed ledgers can be public and can be accessible by anyone, but, in principle, they can also be non-public and only users having a permission may have access to them. It is also possible to differentiate the access permission to data on a ledger from each layered users. Distributed ledgers can use mechanisms in some embodiments, which are known, for example, from the blockchain technology as used for bitcoin. Such mechanisms include discovery method, a consensus mechanism, a mechanism to keep data consistency and so on. The consensus mechanism ensures that all nodes or more than a certain number of nodes, generally electronic devices, having a copy of the distributed ledger reach consensus on the content of the distributed ledger. There are many consensus mechanisms including the so-called proof-of-work mechanism, which is some kind of crypto-puzzle and which ensures that, for example, older blocks of a blockchain cannot be changed (easily). For instance, proof-of-work is used for the mining process of the bitcoin blockchain.

Another example for a distributed ledger which is based on the blockchain technology is the so-called Ethereum project, which may also be used in some embodiments. Ethereum uses accounts and the state of every account is tracked by the Ethereum blockchain. There are two types of accounts, namely externally owned accounts, which are controlled by private keys and contract accounts, which are controlled by their contract code and which can only be activated by an externally owned account. A contract account can include programmable code or smart contracts. Users of Ethereum also have to pay a fee, which is called ether. Ether is rewarded for mining a block.

A further aspect of a distributed ledger is the trust relation established between nodes of the ledger based on the mentioned consensus process in some embodiments. In the bitcoin blockchain proof-of-work is used to add new blocks of transactions to the distributed ledger. Since all the blocks are chained and the proof-of-work function is very complex to compute, it is nearly impossible to change the history of the blockchain.

As an alternative to proof-of-work a consensus protocol is used in some embodiments, such as the known Byzantine fault tolerance algorithm. Typically, by using such algorithms, consensus among nodes can be maintained as long as at least two thirds of the nodes behave correctly. Consensus algorithms may be more relevant for non-public ledgers and situations where proof-of-work is prohibitively complex in some embodiments. In some embodiments, Internet-of-Things (IoT) devices are used for which proof-of-work may be computationally too complex, since IoT devices may have limited computational power.

In some embodiments, a relatively small group of IoT devices may share information and resources. The group of IoT devices may be owned by the same user or company. In some embodiments, a distributed ledger can be used to share such information and enable sharing of resources. However, to maintain consensus reliably, the number of nodes contributing to the ledger may have to be sufficiently large. Also in cases where some devices go offline, for example, the number of nodes should be large, since, as discussed above, the consensus algorithm is only secure in cases where at least, for example, two thirds of the nodes behave correctly.

Hence, some embodiments pertain to embodiments where a distributed ledger may be maintained when the number of nodes is small, and consensus may be maintained when some devices go offline.

Consequently, some embodiments pertain to a device for accessing a distributed ledger. The distributed ledger is maintained by a plurality of virtual nodes. The device includes circuitry configured to access the distributed ledger through at least one virtual node of the plurality of virtual nodes.

The device may be an electronic device and the circuitry may include a processor, a memory, a storage, and other components which are typically included in an electronic device. The electronic device may be a personal computer, a server, a tablet computer, a mobile phone, a smartphone, a laptop computer, an Internet-of-Things device, etc.

The distributed ledger may also be distributed over multiple entities, such as electronic devices, servers, or the like, which may be interconnected with each other, for example, over a network, which may include the internet, and which may be nodes of a network of the distributed ledger network.

The virtual nodes may be configured to communicate over a network with each other, e.g. a local area network, a wireless network, etc., including the internet.

Each of the virtual nodes may include a copy of the distributed ledger. The distributed ledger may be a blockchain, which may be based, for example, on the principles used for the bitcoin or for the Ethereum project. The blockchain may implement typical mechanisms, such as a consensus mechanism which ensures that every node maintaining the blockchain (distributed ledger) reaches a consensus on the content of the blockchain. It may use mining and proof-of-work mechanisms and it even may use some kind of reward (currency), such as ether or bitcoin as currency and/or as reward for performing mining.

The blockchain may include multiple blocks which are formed, for example, on the basis of information about the virtual nodes and/or on the basis of devices hosting the virtual nodes.

The virtual node may be implemented on the basis of a virtual machine or the like, which is located on an apparatus, device or the like.

As discussed above, in some embodiments, the number of devices accessing and contributing to the distributed ledger may be small, such that security issues occur.

Hence, the access to the distributed ledger is restricted to virtual nodes that may be hosted on the device and other devices in some embodiments. The device may access the distributed ledger through the virtual nodes, e.g. by sending a request or message to access the distributed ledger to the virtual node, wherein the virtual node passes the request or message to the distributed ledger, for example, in the case that the request is authorized.

The virtual nodes may be independent from the device. The virtual nodes may also operate independently from device. The integrity of the virtual nodes may be verified, such that only verified virtual nodes are used for accessing the distributed ledger.

In some embodiments, the circuitry of the device is further configured to host at least one virtual node of the plurality of virtual nodes. Hence, in some embodiments, a plurality of devices are present and each device may host at least one of the plurality of virtual nodes.

The virtual nodes may perform a consensus procedure as it is generally known in the art and which may be based on the Byzantine fault tolerance algorithm mentioned above. The number of virtual nodes participating to a consensus protocol may be large, such that the above discussed security issues which arise in cases where only a small number of nodes participates in the consensus procedure of the distributed ledger may be avoided or at least reduced.

Moreover, as a larger number of virtual nodes may be hosted on a device, the total number of virtual nodes maintaining the distributed ledger may be considerably increased by providing a plurality of devices each hosting a plurality of virtual nodes.

In some embodiments, the circuitry of the device is further configured to provide a protected environment in which the at least one virtual node runs. In some embodiments, for each virtual node which is hosted by a respective device, an associated protected environment is provided. The protected environment may be such configured that no other process or no other virtual node has access to the protected environment. Thereby, an attack on the integrity of the virtual node may be avoided. The protected environment may also be shared by all virtual nodes being hosted by a specific device.

The protected environment may include a predefined protected memory area which can only be accessed by the at least one virtual node. Thereby it may be avoided that another virtual node or other process running on the device hosting the virtual node gets access to the protected memory area. Hence, an attack on the virtual node may be avoided. The protected memory area may be specific for each virtual node or it may be shared by all virtual nodes being hosted by a specific device.

In some embodiments, the circuitry is further configured to migrate the at least one virtual node to another device. Hence, in some embodiments, the virtual nodes may be redistributed based on the occurrence of various events. For example, in the case that a virtual node joins or leaves the distributed ledger the virtual node may be migrated to another device. Also in cases where, for example, the device which hosts the at least one virtual device goes offline, is switched off or the like, the at least one virtual node, which is hosted by the device, may migrate to another device which is still operating.

In some embodiments, the migration of the at least one virtual node is performed periodically. Hence, in some embodiments the plurality of virtual nodes may be temporarily redistributed on several devices, whereby security is increased.

In some embodiments, also new or additional virtual nodes are provided on another device(s) if the device hosting the at least one virtual node is switched off, disconnected from the network or the like.

In some embodiments, the circuitry is further configured to run the at least one virtual node in a container. In some embodiments, a container does not include a complete operating system, as it is the case, for example, for virtual machines. The container may include a (protected) environment for a running application, such as a virtual node. Hence, in some embodiments, for each virtual node an own container is provided. The container concept may be part of an operating system, such that by starting a virtual node, each node may be automatically run in a container. In some embodiments, a container may be set up in a very short time, e.g. a few seconds, such that virtual nodes may be provided in an on demand manner in containers.

In some embodiments, each of the plurality of virtual nodes has a unique identifier and/or each of the plurality of virtual nodes has a private key for signing messages. The unique identifier and/or the private key may be issued by a central authority, such that virtual nodes may be authenticated by their unique identifier and messages from the virtual nodes may be authenticated based on the private keys. Thereby, fraudulent virtual nodes may be detected.

Some embodiments pertain to a system for maintaining a distributed ledger. The system includes a plurality of virtual nodes for maintaining the distributed ledger, as discussed above, and a plurality of devices for hosting the plurality of nodes, as discussed above.

In some embodiments, and as also indicated above, the number of virtual nodes is larger than the number of devices. In other words, each of the devices hosts a plurality, e.g. 10, 100 or even thousands of virtual nodes, such that the number of virtual nodes may be much higher, e.g. ten times larger, than the number of devices. Thereby, the integrity of the distributed ledger may be ensured even in cases where the number of devices is small or becomes small, since, for example, a number of devices are switched off or the like.

In some embodiments, each of the plurality of devices is configured to provide a protected environment for each of the virtual nodes which are hosted on the respective device, as it has also been discussed above. The protected environment may include a predefined protected memory area which can only be accessed by an associated virtual node. As discussed, in some embodiments, for each virtual node an own protected memory area is provided, whereby attacks to the virtual node may be avoided.

In some embodiments, each of the plurality of devices is further configured to migrate the plurality of virtual nodes to another device of the plurality of devices, as discussed above. The migration of the plurality of virtual nodes may be performed periodically, whereby security may be enhanced, as discussed above.

Each of the plurality of devices may be further configured to run the plurality of virtual nodes in containers, as discussed above.

The system may further include a central authority which is configured to provide at least one of the following to the plurality of devices: unique identifier for each of the plurality of virtual nodes, private key of each of the plurality of virtual nodes, an executable image of a virtual node, as also discussed above. By providing a unique identifier, a private key and/or an executable image of a virtual node, the security may be improved.

Returning to FIG. 1 there is illustrated a system 1 in which a number of K (K being an integer) devices 2, which are Internet-of-Things devices in the present embodiment, share information and resources on a distributed ledger 3. The devices 2 may provide their own resources to the distributed ledger 3 such that, for example, other devices 2 can get access to the resources. For example, one of the devices 2 may be a digital camera device and another device of the devices 2 may be a storage device. Hence, both devices may provide their resources, i.e. imaging resource and storing resource and respective information about it (e.g. image resolution, storage place, etc.) to the distributed ledger 3. For example, by agreeing on a respective contract, the image device may store image data on the storage device by using the distributed ledger 3.

The devices 2 can access the distributed ledger 3 by using a respective virtual node VN, wherein a number of N virtual nodes is exemplary illustrated in FIG. 1.

Only these virtual nodes VN, which are implemented on the basis of virtual machines or which run in containers as discussed above, have access to the distributed ledger 3.

In the present embodiment, on each of the K devices 2, three virtual nodes are hosted. For example, virtual nodes VN1 to VN3 are hosted by device 1, virtual nodes VN4 to VN6 are hosted by the device 2, . . . , and virtual nodes VN N−2 to VN N are hosted by the device K.

The virtual nodes VN store a copy of the distributed ledger and implement a consensus algorithm, such as the Byzantine fault tolerance algorithm mentioned above.

The number of three virtual nodes which are hosted by each of the devices 2 is only an example which is chosen for illustration. The general idea in this embodiment is to provide much more virtual nodes than devices (i.e. N>>K), such that a reliable consensus can be maintained and such that the system is not vulnerable to an attack in the case that one device or a few devices of the number of K devices 2 fail, e.g. due to switch off or the like.

Furthermore, in the case that a device 2 goes offline or the like, virtual nodes may be migrated to other devices 2 and/or additional virtual nodes may be created.

The command for migrating and/or creating the (additional) virtual nodes may be issued by the device 2 itself and/or by a central authority 5, which has also access to the distributed ledger 3. The central authority 5 may also communicate with the virtual nodes and/or with the devices 2 over a network, such as a local area network or the Internet or the like. Hence, the central authority 5 and the devices 2 may have respective network interfaces.

Figure 2:
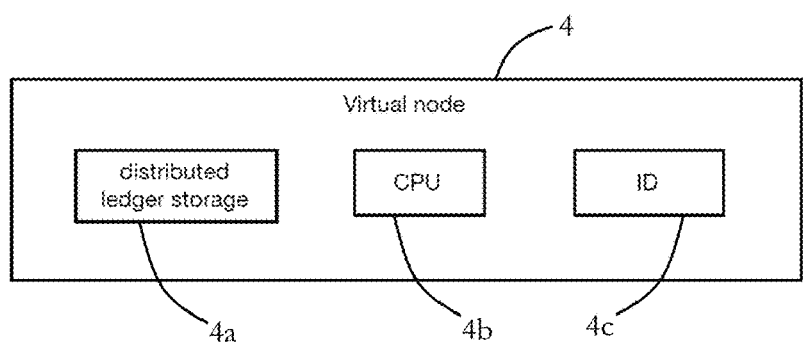
FIG. 2 schematically illustrates a virtual node of the system of FIG. 1.

FIG. 2 schematically illustrates a virtual node 4 which may be one of the virtual nodes VN of FIG. 1. As discussed, the virtual node 4 is exemplary defined as a virtual machine that hosts a distributed ledger. The virtual node 4 stores a local copy of the distributed ledger in a distributed ledger storage 4a. The distributed ledger storage 4a is in this embodiment a storage which is reserved in a virtual machine image that implements the virtual node 4. The virtual node 4 includes a CPU 4b for implementing the consensus protocol. Furthermore, smart contracts may be executed by the CPU 4b. A smart contract may be used, as indicated above, to agree on the usage of resources and the like, as it is also known, for example, from the above discussed Ethereum project. The smart contract may include program code or device logic (code) which may be executed for controlling the respective resource device. Smart contracts may also be based on a Turing (complete) language, such that it is universally applicable.

Moreover, the virtual node 4 has a unique identifier (ID) 4c with which the virtual node 4 can be identified. As discussed, the virtual node 4 may also contain a private key with which messages can be signed, which are sent to the distributed ledger 3.

The central authority 5 may issue both the identifier 4c and the private key. Additionally, the central authority 5 may also provide the executable image of the virtual node 4 to the devices 2. Also, the device 2 and/or the virtual node may provide the executable image of the virtual node to another device.

Figure 3:
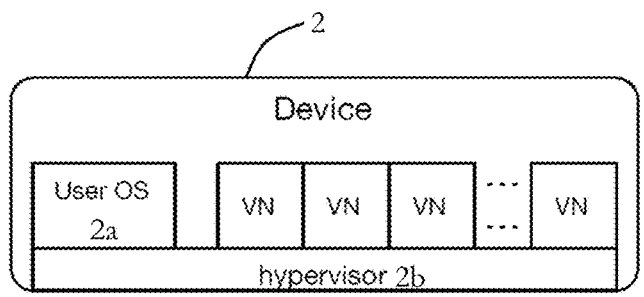
FIG. 3 schematically illustrates a device of the system of FIG. 1.

FIG. 3 schematically illustrates a device 2, as discussed above (see also FIG. 1). The device 2 runs a user operating system 2a that implements the main functionality of the device 2.

Furthermore, the device 2 runs a plurality of virtual nodes VN (see FIG. 2).

In the present embodiment, the device 2 has a hardware support for virtualization in the form of a hypervisor 2b. The hypervisor 2b provides a protected environment by supporting memory management units such that memory pages of the device 2 may only be accessible to the virtual nodes VN. Moreover, access to memory pages that contain code and data can be encrypted, e.g. under control of the hypervisor 2b. Thereby, the virtual nodes have a protected execution environment and regular processes running on the device cannot access the virtual nodes VN. Here, the virtual nodes VN share the protected environment, while in other embodiments, each of the virtual nodes has its own protected environment or groups of virtual nodes have respective protected environments, which are shared by virtual nodes of a specific group.

Device 2 may go offline for several reasons, e.g. due to switch off, a malfunction, network disconnection, maintenance, etc. When such an event occurs, the virtual nodes may be migrated to other devices, as also discussed above. Thereby, the number of virtual nodes may remain much larger than the number of devices 2 such that consensus can be maintained. Such migration may also take place when a new device 2 joins the system 1 and access to the distributed ledger 3 is granted, e.g. by the central authority 5. Moreover, the virtual nodes which have to migrate may be distributed evenly across the remaining devices, which may be managed by the central authority 5 in some embodiments.

As also discussed above, the migration of the virtual nodes VN may be performed on a regular basis, for example, periodically, in order to protect the distributed ledger 3 against malicious devices or attackers.

By randomly migrating all virtual nodes VN running on the devices to randomly chosen other devices, it is ensured that it is difficult or impossible to foresee, which specific virtual node will run on which specific device.

Once a virtual node VN is migrated to a new device 2, the new device 2 or the other virtual nodes VN running on that device may check the integrity of the migrated virtual node. Thereby, it is ensured that malicious devices may only have a potential access to a set of virtual nodes for a limited amount of time, since then the virtual nodes are migrated to another device.

As discussed, each of the devices 2 hosts a plurality of virtual nodes such that the total number of virtual nodes is larger than the number of devices. Furthermore, if the distributed ledger 3 has a number of different owners, wherein the different owners control different devices, the virtual nodes may be divided or distributed such that each owner controls a similar number of virtual nodes running on the devices he owns. Thereby it may be avoided that an owner gets control over a majority of virtual nodes, which may result in a situation where the owner could gain control of the content of the distributed ledger 3. This kind of division may also be performed by the central authority 5, which may have a database or similar where the respective virtual nodes and the associated IDs and the devices which host them are stored.

The number of virtual nodes VN assigned to a device 2 may depend on the capabilities of the device. For instance, a device may have substantial computational capabilities in which case it may host a larger number of virtual nodes than a device with less computational capabilities.

Hence, in some embodiments, a small group of devices can operate a distributed ledger with similar consensus algorithms and consensus performance as it would be the case for a large group of devices. Furthermore, devices may go offline without impacting the consensus performance of the distributed ledger. The risk of attacks by hackers may be mitigated through virtual node migration to other hosting devices.

Figure 4:
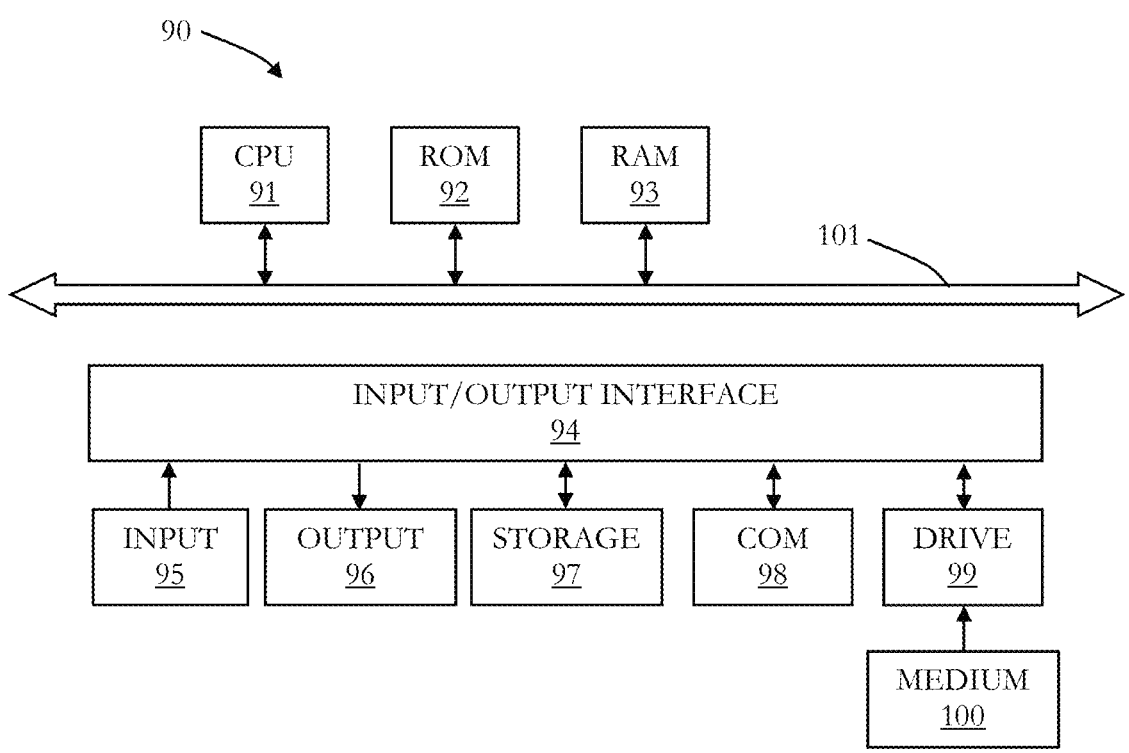
FIG. 4 illustrates a multi-purpose computer.

In the following, an embodiment of a general purpose computer 90 is described under reference of FIG. 4. The computer 90 can be such implemented that it can basically function as a device 2, central authority 5 and/or virtual node of the system 1 described herein. The computer has components 91 to 100, which can form a circuitry, such as any one of the circuitries of the apparatus described herein.

Embodiments which use software, firmware, programs or the like for performing the methods as described herein can be installed on computer 90, which is then configured to be suitable for the concrete embodiment.

The computer 90 has a CPU 91 (Central Processing Unit), which can execute various types of procedures and methods as described herein, for example, in accordance with programs stored in a read-only memory (ROM) 92, stored in a storage 97 and loaded into a random access memory (RAM) 93, stored on a medium 100 which can be inserted in a respective drive 99, etc.

The CPU 91, the ROM 92 and the RAM 93 are connected with a bus 101, which, in turn is connected to an input/output interface 94. The number of CPUs, memories and storages is only exemplary, and the skilled person will appreciate that the computer 90 can be adapted and configured accordingly for meeting specific requirements which arise, when it functions as an apparatus described herein.

At the input/output interface 94 several components are connected: an input 95, an output 96, the storage 97, a communication interface 98 and the drive 99 into which a medium 100 (compact disc, digital video disc, compact flash memory, or the like) can be inserted.

The input 95 can be a pointer device (mouse, graphic table, or the like), a keyboard, a microphone, a camera, a touchscreen, etc.

The output 96 can have a display (liquid crystal display, cathode ray tube display, light emittance diode display, etc.), loudspeakers, etc.

The storage 97 can have a hard disk, a solid state drive and the like.

The communication interface 98 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 90. Alternative configurations may be implemented with additional or other sensors, storage devices, interfaces or the like.

It should be recognized that the embodiments describe methods which are executed by the circuitry of the system, device or the like described herein. The skilled person will appreciate that these methods can also be part of a method for maintaining a distributed ledger. The specific ordering of the steps discussed herein is given for illustrative purposes only and should not be construed as binding.

It is noted that the division of the system, the virtual node and the device into units is only made for illustration purposes and that the present disclosure is not limited to any specific division of functions in specific units.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, such as system 1, device 2 and virtual node VN described above, it will be appreciated that a computer program providing such software control and a transmission, storage or other medium by which such a computer program is provided are envisaged as aspects of the present disclosure.

Note that the present technology can also be configured as described below.

(1) A device for accessing a distributed ledger, wherein the distributed ledger is maintained by a plurality of virtual nodes, the device comprising circuitry configured to:
  access the distributed ledger through at least one virtual node of the plurality of virtual nodes.

(2) The device of (1), wherein the circuitry is further configured to host at least one virtual node of the plurality of virtual nodes.

(3) The device of (2), wherein the circuitry is further configured to provide a protected environment in which the at least one virtual node runs.

(4) The device of (3), wherein the protected environment includes a predefined protected memory area which can only be accessed by the at least one virtual node.

(5) The device of anyone of (2) to (4), wherein the circuitry is further configured to migrate the at least one virtual node to another device.

(6) The device of (5), wherein the migration of the at least one virtual node is performed periodically.

(7) The device of anyone of (2) to (6), wherein the circuitry is further configured to run the at least one virtual node in a container.

(8) The device of anyone of (1) to (7), wherein each of the plurality of virtual nodes has a unique identifier.

(9) The device of anyone of (1) to (8), wherein each of the plurality of virtual nodes has a private key for signing messages.

(10) A system for maintaining a distributed ledger, comprising:
  a plurality of virtual nodes for maintaining the distributed ledger;
  and a plurality of devices for hosting the plurality of nodes.

(11) The system of (10), wherein the number of virtual nodes is larger than the number of devices.

(12) The system of (11), wherein the number of virtual nodes is at least ten times larger than the number of devices.

(13) The system of anyone of (10) to (12), wherein each of the plurality of devices is configured to provide a protected environment for each of the virtual nodes.

(14) The system of (13), wherein the protected environment includes a predefined protected memory which can only be accessed by an associated virtual node.

(15) The system of anyone of (10) to (14), wherein each of the plurality of devices is further configured to migrate the plurality of virtual nodes to another device of the plurality of devices.

(16) The system of (15), wherein the migration of the plurality of virtual nodes is performed periodically.

(17) The system of anyone of (10) to (16), wherein each of the plurality of devices is further configured to run the plurality of virtual nodes in containers.

(18) The system of anyone of (10) to (17), wherein each of the plurality of virtual nodes has a unique identifier.

(19) The system of anyone of (10) to (18), wherein each of the plurality of virtual nodes has a private key for signing messages.

(20) The system of anyone of (10) to (19) further comprising a central authority configured to provide at least one of the following to the plurality of devices: unique identifier for each of the plurality of virtual nodes, private key of each of the plurality of virtual nodes, an executable image of a virtual node.

The invention claimed is:

1. A device for accessing a distributed ledger, wherein the distributed ledger is maintained by a plurality of virtual nodes, the device comprising circuitry configured to:
  access the distributed ledger through at least one virtual node of the plurality of virtual nodes;
  provide a protected environment in which the at least one virtual node runs, wherein the protected environment includes a predefined protected memory area which can only be accessed by the at least one virtual node;
  receive from a central authority a unique identifier for each of the plurality of virtual nodes; and
  randomly migrate all virtual nodes of the plurality of virtual nodes from the device to randomly selected other devices, wherein the random migration is independent of the performance of the virtual nodes.

2. The device of claim 1, wherein the circuitry is further configured to host at least one virtual node of the plurality of virtual nodes.

3. The device of claim 2, wherein the circuitry is further configured to run the at least one virtual node in a container.

4. The device of claim 1, wherein each of the plurality of virtual nodes has a unique identifier.

5. The device of claim 1, wherein each of the plurality of virtual nodes has a private key for signing messages.

6. A system for maintaining a distributed ledger, comprising:
   a plurality of virtual nodes for maintaining the distributed ledger;
   a plurality of devices, each comprising circuitry, for hosting the plurality of nodes, wherein each of the plurality of devices is configured to provide a protected environment for each of the virtual nodes, wherein the protected environment includes a predefined protected memory area which can only be accessed by an associated virtual node and wherein each of the plurality of devices is configured to randomly migrate all virtual nodes of the plurality of virtual nodes from the device to randomly selected other devices, wherein the random migration is independent of the performance of the virtual nodes; and
   a central authority including circuitry configured to provide to the plurality of devices a unique identifier for each of the plurality of virtual nodes.

7. The system of claim 6, wherein the number of virtual nodes is larger than the number of devices.

8. The system of claim 7, wherein the number of virtual nodes is at least ten times larger than the number of devices.

9. The system of claim 6, wherein each of the plurality of devices is further configured to run the plurality of virtual nodes in containers.

10. The system of claim 6, wherein each of the plurality of virtual nodes has a unique identifier.

11. The system of claim 6, wherein each of the plurality of virtual nodes has a private key for signing messages.

* * * * *